Feb. 25, 1930.                C. E. HENDERSON                1,748,840
TIRE CHAIN SNAP LOCK FASTENER
Filed Sept. 28, 1929
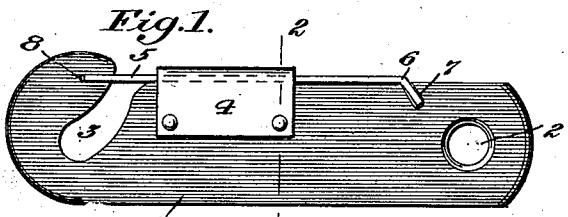
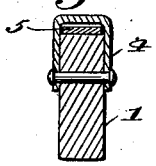
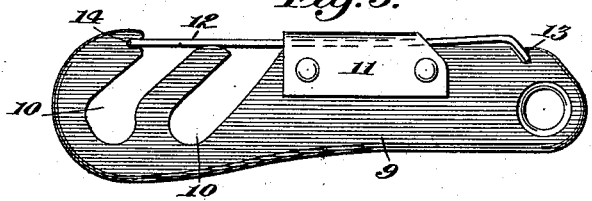
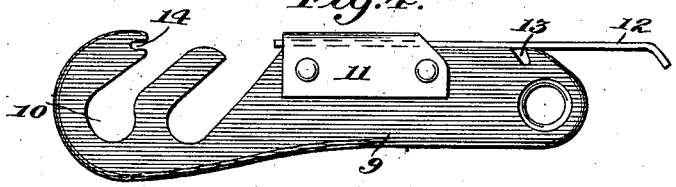
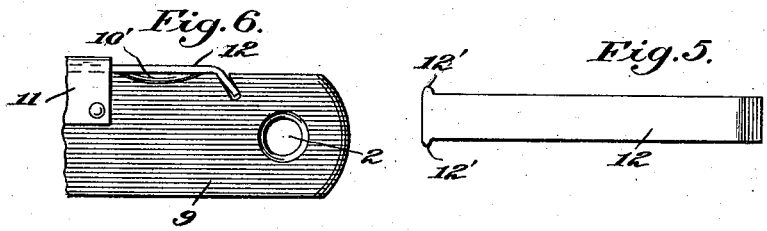
Inventor:
Charles E. Henderson,
by Jas. L. Skidmore
Att'y.

Patented Feb. 25, 1930

1,748,840

UNITED STATES PATENT OFFICE

CHARLES E. HENDERSON, OF CHICKASHA, OKLAHOMA

TIRE-CHAIN SNAP-LOCK FASTENER

Application filed September 28, 1929. Serial No. 395,835.

This invention pertains to an improved and novel tire chain snap lock fastener, and while this particular construction of fastener is adapted for various purposes it is especially designed for use in connecting and safely securing non-skid chains such as are commonly applied to the tires of motor vehicles.

The main object of the invention is to provide a simple, durable, economical and efficient means for securing and locking tire chains around the tire, when the chains shall have been applied to the tire.

Further objects of the invention are to so construct the chain locking and securing means that it will include means for taking up slack in the chains thereby insuring a neater and more accurate fitting of the tire chains around the tire, and preventing too much looseness and swinging movement of the chains, and provides locking means which will prevent any accidental disengagement of the chains from the fastening device, thereby maintaining the chains in their proper position with relation to the tire, even when the chains are subjected to exceedingly rough usage.

The foregoing and such other objects as may appear are accomplished by the construction, arrangement, location and combination of the several parts hereinafter more fully described, illustrated by the accompanying drawings and particularly pointed out in the claims appended hereto, it being understood that slight changes in the precise form, proportions and minor details of construction may be resorted to without departing from the spirit or sacrificing any of the advantages of the invention.

In the accompanying drawings forming a part of this specification it will be seen that:

Figure 1 is a side elevation of the improved means embodying my invention.

Figure 2 is a transverse section taken in the plane of the dotted lines 2—2, Fig. 1.

Figure 3 is a side elevation of a slightly modified form of fastening means showing it in its locked condition.

Figure 4 is a side elevation of the device shown in Fig. 3, showing its locking member in the unlocked position, and Figures 5 and 6 represent detail views thereof.

In the embodiment of my invention as illustrated, it will be seen by reference to Fig. 1 of the drawings that the numeral 1 designates a certain form of hook body formed from any suitable or desirable metal, preferably of a high grade steel, and preferably of rectangular shape in cross-section, as clearly shown in Fig. 2, and centrally formed near its rear end portion is an opening 2 adapted for the reception of the link of a chain or a rivet, while at its forward end portion it is provided with a notched opening 3 for the reception of one or more of the end links of the tire chain or portion of the chain, and intermediate its ends is rigidly secured in any suitable or desirable manner, preferably riveted to each side face thereof and extending slightly above its upper face is a yoke member 4 formed from a metallic plate and bent into the formation, such as shown in Fig. 2, for the reception of the locking member 5, between its upper face and the inner face of the member 4, said locking member 5 being formed at its rear end with a downwardly and outwardly extended portion 6 adapted to be engaged and held within the enclosed recess 7 formed in the upper face of the hook body member and near the rear end portion thereof, while the forward flat end portion of the member 5 is adapted to be fitted into a horizontally disposed slot 8, formed in the forward end portion of the hook body.

By reference to Fig. 3 it will be seen that the hook body 9 is provided with a plurality of notched recesses 10, adapted to secure and retain one or more links of a tire chain in each recess, thereby adjustably securing the chain and insuring a more desirable and accurate fitting of the chain around the tire, said hook body having secured thereto a yoke member 11, and a locking member 12 shown in its locked position with its rear end portion resting within the notch or recess 13 and its forward end portion seating within the notched portion 14 formed in the hook body member.

The device shown in Fig. 4 represents the device shown in Fig. 3 in its unlocked position, that is, the locking member 12 has been removed from the recess 13 and slid rearwardly, thus leaving the plurality of notched recesses 10 open, for the reception and engagement of one or more of the chain links, the major portion of the locking member resting on the upper face of the hook body and beneath the yoke member 11. To unfasten the locking member, it is advisable to insert a screw driver, or other flat instrument under its rear portion a slight twist of the instrument being sufficient to lift the member and disengage it from the notch 13, then slide the member rearwardly until it assumes the position shown in said Fig. 4. To lock the hook body simply push the locking member forwardly until it is caused to assume the position shown in Fig. 3.

It will be understood that my improved fastening and locking means may be made of any suitable or desirable dimensions, and of any desirable material possessing the required strength and durability, and while only two notches for the engagement of the links of a tire chain are shown in the drawings, it will be readily evident that any desirable number of chain securing notches may be employed, dependent upon the purpose for which the securing means is to be applied or intended.

By reference to the detail views shown in Figs. 5 and 6, it will be seen that Fig. 5 shows a plan view of the steel plate locking means detached from the hook body with lateral extensions 12' formed at one end thereof to prevent said plate from being accidentally lost from the hook body when in unlocked condition, and Fig. 6 shows a beveled portion 10' for the ready reception of a flat instrument or screw-driver to unlock the spring plate when said plate is made with a heavy plate spring.

Having thus described my invention, what I claim and desire to secure by Letters Patent is:

1. A tire chain snap lock fastener, comprising a hook body, a yoke member rigidly secured to each side of said hook body and extending above its upper face, and a locking member having a downward and outward extension at its rear end fitted in a corresponding recess formed in the upper face of the rear end portion of the hook body and its forward end seated in a horizontally disposed slot formed in the forward end portion of said hook body.

2. A tire chain fastener of the character described, comprising a hook body, a metallic yoke member riveted to each side face of the hook body and extending above the upper face of the hook body, and a locking member seated on the upper face of said hook body and slidingly disposed between the hook and said yoke, said locking member having a downwardly and outwardly extension formed at its rear end adapted to be fitted in a corresponding recess formed in the hook body with its front end fitted in a horizontally disposed slot formed in the front end portion of the hook body.

3. A fastener of the character described, comprising a hook body having a plurality of notches formed therein for the reception of chain links, a yoke member fixedly secured to each side face of the hook body and extending above the upper face of the hook body, and a steel spring plate locking member slidingly disposed between the upper face of the hook body and the inner face of the yoke, the rear end portion of the locking member being fitted in a recess formed in the rear end portion of the hook body and the front end portion of the locking member fitted in a horizontally disposed recess formed in the forward portion of said hook body.

4. A fastening device of the character described, comprising a hook body formed with a downward and inwardly disposed recess formed in its upper face and a horizontally disposed recess formed in its front end portion, a yoke rigidly secured to the hook body, a locking member slidingly disposed between the upper face of the hook body and said yoke, the rear end portion of the locking member being adapted to be fitted in the recess formed in the upper face of the hook body and the front end portion adapted to be fitted in the recess formed in the front end portion of said hook body.

CHARLES E. HENDERSON.